United States Patent
Ogawa et al.

(10) Patent No.: US 11,133,515 B2
(45) Date of Patent: Sep. 28, 2021

(54) FUEL CELL SYSTEM AND SCAVENGING METHOD OF FUEL CELL

(71) Applicant: TOYOTA JIDOSHA KABUSHIKI KAISHA, Toyota (JP)

(72) Inventors: Tomohiro Ogawa, Miyoshi (JP); Hiroyuki Imanishi, Toyota (JP); Yohei Okamoto, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 902 days.

(21) Appl. No.: 15/429,463

(22) Filed: Feb. 10, 2017

(65) Prior Publication Data
US 2017/0237092 A1 Aug. 17, 2017

(30) Foreign Application Priority Data
Feb. 15, 2016 (JP) .............................. JP2016-026099

(51) Int. Cl.
*H01M 8/04* (2016.01)
*H01M 8/04303* (2016.01)
(Continued)

(52) U.S. Cl.
CPC ... *H01M 8/04753* (2013.01); *H01M 8/04201* (2013.01); *H01M 8/04231* (2013.01);
(Continued)

(58) Field of Classification Search
CPC ......... H01M 8/04753; H01M 8/04303; H01M 8/04201; H01M 8/04231; H01M 8/04373;
(Continued)

(56) References Cited

U.S. PATENT DOCUMENTS

2007/0026278 A1* 2/2007 Wake ................ H01M 8/04156
429/429
2007/0092771 A1* 4/2007 Wake ................ H01M 8/04179
429/414
(Continued)

FOREIGN PATENT DOCUMENTS

DE 10 2007 029 420 A1 1/2008
JP 2007-157621 * 6/2007 .............. H01M 8/04
(Continued)

OTHER PUBLICATIONS

JP 2007-157621 Espacenet English Machine Translation Jun. 21, 2007.*
(Continued)

*Primary Examiner* — Cynthia H Kelly
*Assistant Examiner* — Aaron J Greso
(74) *Attorney, Agent, or Firm* — Finnegan, Henderson, Farabow, Garrett & Dunner, LLP

(57) ABSTRACT

A fuel cell system has a battery, a gas supply portion, a temperature acquisition portion configured to acquire a presumed temperature that is presumed to reach during the operation stop of the fuel cell; and a scavenging controlling portion. When it is determined that the presumed temperature is a predetermined temperature or more at the time of the operation stop of the fuel cell, the scavenging controlling portion performs the stop-time scavenging operation with a first scavenging ability; and when it is determined that the presumed temperature is less than the predetermined temperature, the scavenging controlling portion performs the stop-time scavenging operation with a second scavenging ability higher than the first scavenging ability.

14 Claims, 10 Drawing Sheets

(51) Int. Cl.
  *H01M 10/48* (2006.01)
  *H01M 8/04746* (2016.01)
  *H01M 8/04223* (2016.01)
  *H01M 8/04082* (2016.01)
  *H01M 8/0432* (2016.01)

(52) U.S. Cl.
  CPC ... *H01M 8/04303* (2016.02); *H01M 8/04373* (2013.01); *H01M 10/486* (2013.01); *H01M 2250/20* (2013.01); *Y02T 90/40* (2013.01)

(58) Field of Classification Search
  CPC .......... H01M 8/04253; H01M 10/486; H01M 8/04298; H01M 8/0432; H01M 8/044492; H01M 8/06; Y02T 90/40; Y02E 60/10; Y02E 60/50
  See application file for complete search history.

(56) References Cited

U.S. PATENT DOCUMENTS

| | | |
|---|---|---|
| 2007/0298289 A1 | 12/2007 | Clingerman et al. |
| 2010/0015482 A1* | 1/2010 | Kajiwara ............ H01M 8/0485 429/515 |
| 2013/0034787 A1 | 2/2013 | Miyata et al. |

FOREIGN PATENT DOCUMENTS

| | | | |
|---|---|---|---|
| JP | 2008-034309 A | | 2/2008 |
| JP | 2013-37790 | | 2/2013 |
| JP | 2014-137887 | * | 7/2014 .............. H01M 8/00 |

OTHER PUBLICATIONS

JP 2014-137887 Espacenet English Machine Translation Jul. 28, 2014.*

* cited by examiner

| TEMPERATURE CONDITION | T<T1 | T1≤T |
|---|---|---|
| STOP-TIME SCAVENGING OPERATION | SECOND SCAVENGING ABILITY | FIRST SCAVENGING ABILITY |
| PARKING SCAVENGING OPERATION | | ANODE SCAVENGING |

FIG. 10

| | TEMPERATURE CONDITION | T<T1 | T1≤T<T2 | T2≤T |
|---|---|---|---|---|
| WINTER DETERMINATION ON | STOP-TIME SCAVENGING OPERATION | SECOND SCAVENGING ABILITY | FIRST SCAVENGING ABILITY ANODE SCAVENGING | FIRST SCAVENGING ABILITY ANODE SCAVENGING |
| | PARKING SCAVENGING OPERATION | | | |
| WINTER DETERMINATION OFF | STOP-TIME SCAVENGING OPERATION | SECOND SCAVENGING ABILITY | FIRST SCAVENGING ABILITY ANODE SCAVENGING | |
| | PARKING SCAVENGING OPERATION | | | CATHODE SCAVENGING + ANODE SCAVENGING |

FUEL CELL SYSTEM AND SCAVENGING METHOD OF FUEL CELL

INCORPORATION BY REFERENCE

The disclosure of Japanese Patent Application No. 2016-026099 filed on Feb. 15, 2016 including the specification, drawings and abstract is incorporated herein by reference in its entirety.

BACKGROUND

1. Technical Field

The present disclosure relates to a fuel cell system and a scavenging method of a fuel cell.

2. Description of Related Art

In terms of a fuel cell, moisture content caused due to water or the like generated along with an operation might remain in the fuel cell after an operation stop of the fuel cell. The moisture content in the fuel cell might be frozen due to a decrease of an outside temperature. In view of this, a process called scavenging might be performed at the time of the stop of the fuel cell (for example, see Japanese Patent Application Publication No. 2013-37790 (JP 2013-37790 A)). A target for the scavenging might include not only a fuel cell stack, but also a duct around the fuel cell stack or accessories such as a pump placed in the duct. Further, in a case of a fuel cell vehicle exposed to an external air over a long period, even if an outside temperature is not very low at the time of a vehicle stop, the outside temperature decreases during the vehicle stop, which might freeze the moisture content inside the fuel cell. Accordingly, when it is anticipated that the outside temperature decreases to a predetermined temperature or less during the stop of the vehicle, scavenging is performed on the fuel cell in the vehicle that has been stopped. Such scavenging during the stop is referred to as parking scavenging. At the time of the parking scavenging, the fuel cell does not generate electric power, so a parking scavenging operation is performed by use of electrical energy charged in a battery.

SUMMARY

However, when a temperature of the battery decreases at the time when the battery is used for the scavenging, the battery might deteriorate due to discharge. However, in a case where the parking scavenging is not performed when the temperature of the battery decreases, the fuel cell stack and the like might be frozen. The above state is not limited to the fuel cell vehicle, but is common to a fuel cell system that performs scavenging by use of a battery during a stop of a fuel cell.

The present disclosure provides a fuel cell system that performs scavenging on a fuel cell, and a scavenging method of a fuel cell.

A fuel cell system according to a first aspect of the present disclosure performs scavenging of a fuel cell. The fuel cell system includes: a battery configured to supply electric power at least during an operation stop of a fuel cell; a gas supply portion configured to receive the electric power supplied from the battery and supply gas to the fuel cell; a temperature acquisition portion configured to acquire a presumed temperature that a temperature of the battery is presumed to reach during the operation stop of the fuel cell; and a scavenging controlling portion configured to control the supply of the gas to the fuel cell from the gas supply portion at the time of the operation stop of the fuel cell, and perform a stop-time scavenging operation to scavenge the fuel cell. When it is determined that the presumed temperature is a predetermined temperature or more at the time of the operation stop of the fuel cell, the scavenging controlling portion performs the stop-time scavenging operation with a first scavenging ability. When it is determined that the presumed temperature is less than the predetermined temperature, the scavenging controlling portion performs the stop-time scavenging operation with a second scavenging ability higher than the first scavenging ability.

According to the fuel cell system of the first aspect, in the stop-time scavenging operation performed at the time when the operation of the fuel cell is stopped, if the presumed temperature of the battery is less than the predetermined temperature at the time of the stop of the fuel battery, the scavenging is performed with the second scavenging ability higher than the first scavenging ability, so that moisture content existing in a scavenging target such as the fuel cell or its periphery can be drained still more. Accordingly, in a state where the presumed temperature of the battery becomes less than the predetermined temperature during the stop of the fuel cell and discharge of the battery causes deterioration of the battery, it is possible not to perform the scavenging by use of the battery. As a result, if the scavenging is not performed in such a state, deterioration of the battery is not caused, and it is possible to reduce a possibility to lose reliability and durability of the battery, and eventually, the fuel cell system.

In the present specification, the fuel cell means a configuration to perform electric-power generation using fuel gas by use of an electrochemical reaction. The fuel cell can be realized by a single power generation body, but it is also possible to take a configuration of a fuel cell stack in which a plurality of electric-power generation units (also referred to as single cells) is laminated. The operation stop of the fuel cell indicates to stop supply of the fuel gas to the fuel cell and stop the electric-power generation. The time of the stop is not limited to a timing at which the supply of the fuel gas is stopped or the electric-power generation is stopped, but also including timings before and after the stop. The stop-time scavenging operation may be performed at a timing when the supply of the fuel gas to the fuel cell is stopped and the electric-power generation is completely stopped, or may be performed after the stop of the supply of the fuel gas but before the electric-power generation is completely stopped. Alternatively, on the premise that a process of stopping the supply of the fuel gas is started, the stop-time scavenging operation may be performed right before the stop of the supply of the fuel gas.

In the fuel cell system according to the above aspect, the scavenging controlling portion may be further configured such that, when the operation of the fuel cell is stopped, the scavenging controlling portion controls the supply of the gas from the gas supply portion to the fuel cell at a predetermined timing during the operation stop of the fuel cell, and perform a parking scavenging operation of scavenging the fuel cell. When it is determined that the presumed temperature is the predetermined temperature or more, the scavenging controlling portion may be configured to perform the parking scavenging operation, and when it is determined that the presumed temperature is less than the predetermined temperature, the scavenging controlling portion may be configured not to perform the parking scavenging operation.

According to the above aspect, when the presumed temperature of the battery is less than the predetermined temperature, the parking scavenging operation is not performed. Accordingly, it is possible to restrain discharge from the battery when the presumed temperature of the battery is less than the predetermined temperature. Accordingly, it is possible to restrain a possibility to cause deterioration of the battery, and to reduce a possibility to impair reliability and durability of the battery, and eventually, the fuel cell system.

In the fuel cell system according to the above aspect, when it is determined that the presumed temperature is not less than a threshold temperature higher than the predetermined temperature, the scavenging controlling portion may be configured not to perform the stop-time scavenging operation.

With such a configuration, the parking scavenging operation is performed when the presumed temperature of the battery is the predetermined temperature or more. In this case, if the presumed temperature of the battery is sufficiently high, it is possible to restrain an occurrence of malfunction such as freezing of the fuel cell even if the stop-time scavenging operation is not performed. This accordingly makes it possible to restrain discharge of the battery, required for the stop-time scavenging operation.

In the fuel cell system according to the above aspect, the scavenging controlling portion may be configured to determine whether or not a predetermined condition under which the fuel cell might be frozen is satisfied. At the time of the operation stop of the fuel cell, when it is determined that the predetermined condition is not satisfied and the presumed temperature is not less than a threshold temperature higher than the predetermined temperature, the scavenging controlling portion may be configured not to perform the stop-time scavenging operation.

With such a configuration, if the condition under which the fuel cell might be frozen is not satisfied in a winter determination, it is possible to restrain an occurrence of malfunction such as freezing of the fuel cell even if the stop-time scavenging operation is not performed. This accordingly makes it possible to restrain discharge of the battery.

In the fuel cell system according to the above aspect, the scavenging controlling portion may be configured to perform scavenging on an anode side of the fuel cell and scavenging on a cathode side of the fuel cell individually in the parking scavenging operation. When it is determined that the condition is not satisfied and it is determined that the presumed temperature is the threshold temperature or more, the scavenging controlling portion may be configured to perform the scavenging on the anode side of the fuel cell and the scavenging on the cathode side of the fuel cell in the parking scavenging operation, and when the condition is satisfied or it is determined that the presumed temperature is less than the threshold temperature and not less than the predetermined value, the scavenging controlling portion may be configured to perform the scavenging on the anode side in the parking scavenging operation.

With such a configuration, when it is determined that the presumed temperature is not less than the threshold temperature higher than the predetermined temperature, the stop-time scavenging operation is not performed, but in the parking scavenging operation, the scavenging on the cathode side and the scavenging on the anode side are performed. Accordingly, it is possible to sufficiently drain moisture content in the fuel cell.

The fuel cell system according to the above aspect may further include a temperature sensor configured to detect the temperature of the battery. The temperature acquisition portion may be configured to acquire, as the presumed temperature, the temperature of the battery thus detected by the temperature sensor at the time of the stop of the fuel cell.

This is because the battery temperature at the time of the stop of the fuel cell and the presumed temperature are not so different from each other within a short time from the stop of the fuel cell. In the present specification, the presumed temperature that the temperature of the battery is presumed to reach during the operation stop of the fuel cell is a temperature that the temperature of the battery is presumed to change and reach while the operation of the fuel cell is stopped, and is a temperature to be used to determine whether or not discharge from the battery may be performed during the operation stop of the fuel cell. Such a presumed temperature of the battery may be presumed by use of the temperature of the battery, or may be acquired by other acquisition methods such as presumption using data of a past temperature change, presumption based on a time and a season when the operation of the fuel cell is stopped, and presumption based on information from an external weather server.

A scavenging method for a fuel cell according to a second aspect of the present disclosure is such that, at the time of an operation stop of the fuel cell, gas is supplied to the fuel cell by use of electric power from a battery, and perform scavenging of the fuel cell. The scavenging method for the fuel cell includes: acquiring a presumed temperature that a temperature of the battery is presumed to reach during the operation stop of the fuel cell; and determining whether or not the presumed temperature is a predetermined temperature or more, at the time of the operation stop of the fuel cell. i) When it is determined that the presumed temperature is the predetermined temperature or more at the time of the operation stop of the fuel cell, the scavenging of the fuel cell is performed with a first scavenging ability, and ii) when it is determined that the presumed temperature is less than the predetermined temperature, the scavenging of the fuel cell is performed with a second scavenging ability higher than the first scavenging ability.

According to the scavenging method of the fuel cell of the second aspect, if the presumed temperature of the battery is less than the predetermined temperature at the time of the stop of the fuel battery, the scavenging is performed with the second scavenging ability higher than the first scavenging ability, so that moisture content existing in a scavenging target such as the fuel cell or its periphery can be drained still more. Accordingly, in a state where the presumed temperature of the battery becomes less than the predetermined temperature during the stop of the fuel cell and discharge of the battery causes deterioration of the battery, it is possible not to perform the scavenging by use of the battery. As a result, if the scavenging is not performed in such a state, deterioration of the battery is not caused, and it is possible to reduce a possibility to impair reliability and durability of the battery.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 10 is an explanatory view illustrating a relationship between a temperature and a scavenging operation at the time of a vehicle stop in the third embodiment.

DETAILED DESCRIPTION OF EMBODIMENTS

Figure 1:
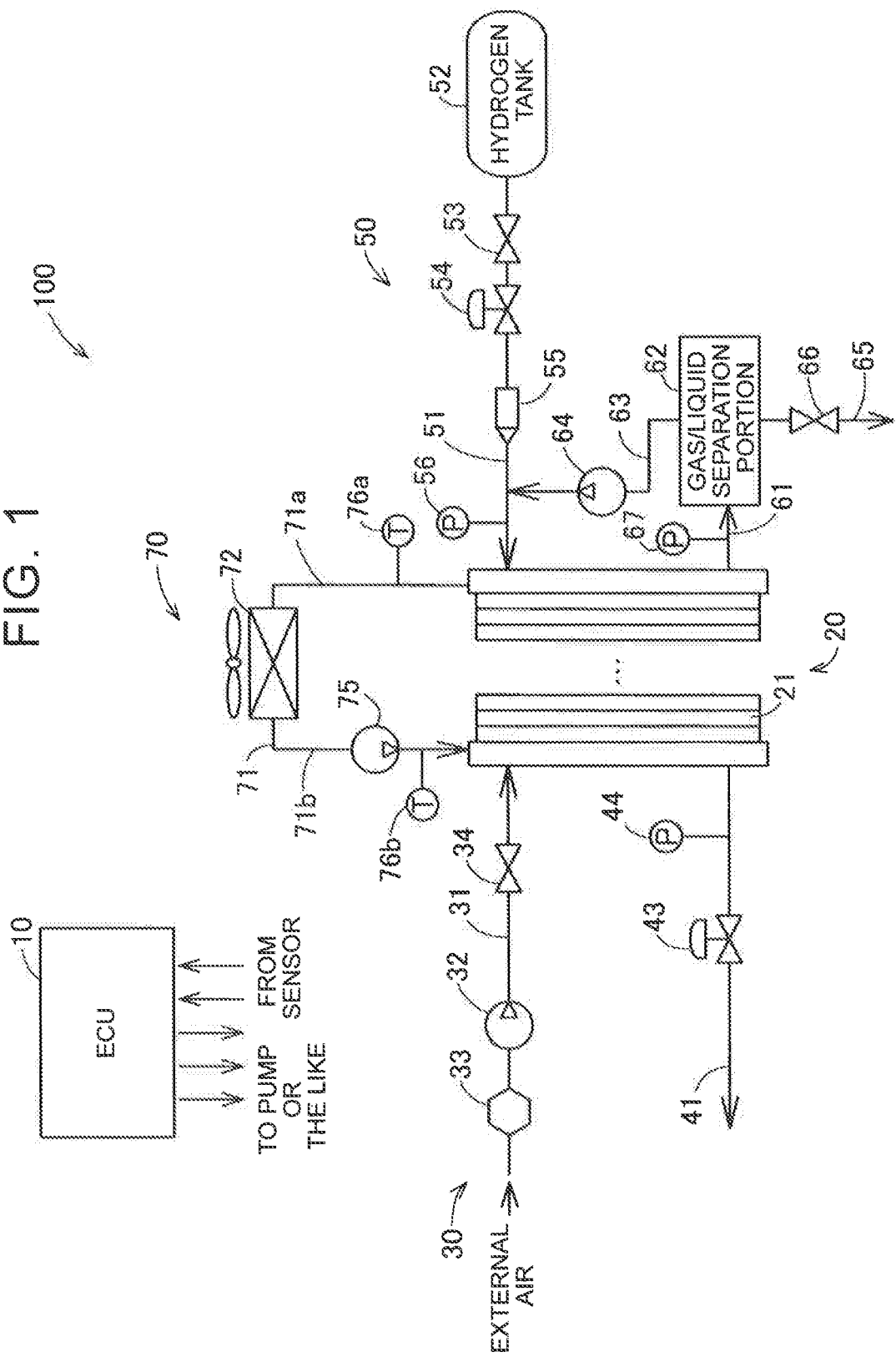
FIG. 1 is a schematic configuration diagram illustrating a fuel cell system in an embodiment.

Descriptions are now made of some embodiments of the present disclosure. An overall configuration is described referring to FIGS. 1 and 2. A fuel cell system 100 herein is provided in a fuel cell vehicle, and generates and outputs electric power necessary for driving of a vehicle and the like based on a request from a driver. The fuel cell vehicle is a four-wheeled vehicle, for example. The fuel cell system 100 includes an electronic control unit (ECU) 10, a fuel cell stack 20, an air supply-discharge portion 30, a hydrogen gas supply-discharge portion 50, and a refrigerant circulation portion 70.

The ECU 10 is constituted by a microcomputer including a central processing unit (CPU) and a storage device. Various functions are demonstrated by the CPU executing programs in the storage device. The ECU 10 has a function to read signals from a plurality of sensors and the like described below and to control actuators for a pump and the like, so as to control various constituent parts of the fuel cell system 100 to cause the fuel cell stack 20 to generate electric power corresponding to an output request. Further, as will be described later, the ECU 10 functions as a temperature acquisition portion that acquires a presumed temperature of a battery and a scavenging controlling portion 15 that performs scavenging on the fuel cell stack 20.

The fuel cell stack 20 is a unit that generates electric power by an electrochemical reaction between hydrogen and oxygen, and is formed by laminating a plurality of single cells 21. Each single cell 21 is a power generation element that can generate electric power by itself, and includes a membrane electrode assembly, which is a power generation body configured such that electrodes (a cathode, an anode) are placed on both sides of an electrolyte membrane, and separators placed on both outer sides of the membrane electrode assembly. The electrolyte membrane is constituted by a solid polymer membrane exhibiting a good proton conductivity in a wet state where moisture content is contained therein. As the fuel cell stack 20, various types are usable, but the present embodiment uses a solid polymer type.

The air supply-discharge portion 30 has a function to supply air (oxidant gas) to the fuel cell stack 20, and a function to discharge moisture content on a cathode side of the fuel cell stack 20 and a cathode exhaust gas to outside the fuel cell system 100. The air supply-discharge portion 30 includes an air supply pipe 31, an air compressor 32, an air-flow meter 33, and an opening/closing valve 34 on an upstream side relative to the fuel cell stack 20. The air supply pipe 31 is a pipe connected to a cathode-side inlet of the fuel cell stack 20. The air compressor 32 is connected to the fuel cell stack 20 via the air supply pipe 31 and is configured to take external air therein, compress the air, and then supply the air thus compressed to the cathode side of the fuel cell stack 20 as the oxidant gas in electric-power generation in the single cells 21.

The air-flow meter 33 measures, on the upstream side of the air compressor 32, an amount of the external air to be taken in by the air compressor 32, and outputs it to the ECU 10. The ECU 10 controls a supply amount of the air to the fuel cell stack 20 by driving the air compressor 32 based on a measured value obtained herein. The opening/closing valve 34 is provided between the air compressor 32 and the fuel cell stack 20. The opening/closing valve 34 is normally closed, and when the air having a predetermined pressure is supplied from the air compressor 32 to the air supply pipe 31, the opening/closing valve 34 is opened.

The air supply-discharge portion 30 includes a cathode exhaust gas pipe 41, a pressure regulating valve 43, and a pressure measuring portion 44 on a downstream side relative to the fuel cell stack 20. The cathode exhaust gas pipe 41 is a pipe connected to a cathode-side outlet of the fuel cell stack 20, and can discharge waste water and the cathode exhaust gas to outside the fuel cell system 100. The pressure regulating valve 43 adjusts a pressure (a cathode-side back pressure of the fuel cell stack 20) of the cathode exhaust gas in the cathode exhaust gas pipe 41. The pressure measuring portion 44 is provided on the upstream side relative to the pressure regulating valve 43, and measures a pressure of the cathode exhaust gas and outputs its measured value to the ECU 10. The ECU 10 adjusts an opening degree of the pressure regulating valve 43 based on the measured value of the pressure measuring portion 44 at the time of an operation of the fuel cell stack 20.

The hydrogen gas supply-discharge portion 50 has a function to supply hydrogen gas to the fuel cell stack 20, a function to discharge anode exhaust gas discharged from the fuel cell stack 20 to outside the fuel cell system 100, and a function to circulate the hydrogen gas in the fuel cell system 100. The hydrogen gas supply-discharge portion 50 includes a hydrogen gas supply pipe 51 and a hydrogen tank 52 on the upstream side relative to the fuel cell stack 20. High-pressure hydrogen to be supplied to the fuel cell stack 20 is filled in the hydrogen tank 52. The hydrogen tank 52 is connected to an anode-side inlet of the fuel cell stack 20 via the hydrogen gas supply pipe 51.

Further, the hydrogen gas supply pipe 51 includes an opening/closing valve 53, a regulator 54, a hydrogen supply device 55, and a pressure measuring portion 56, which are provided in this order from the upstream side (a hydrogen-tank-52 side). The ECU 10 controls the opening/closing valve 53 to be opened and closed, so as to control inflow of hydrogen from the hydrogen tank 52 to the upstream side of the hydrogen supply device 55. The regulator 54 is a pressure reducing valve that adjusts a pressure of hydrogen on the upstream side of the hydrogen supply device 55, and an opening degree of the regulator 54 is controlled by the ECU 10. The hydrogen supply device 55 is constituted by an injector that is an electromagnetically driven opening/closing valve, for example. The pressure measuring portion 56 measures a pressure of hydrogen on the downstream side of the hydrogen supply device 55 and outputs it to the ECU 10. The ECU 10 controls an amount of hydrogen to be supplied to the fuel cell stack 20 by controlling a driving period indicative of an opening/closing timing of the hydrogen supply device 55 based on a measured value of the pressure measuring portion 56.

The hydrogen gas supply-discharge portion 50 includes, on the downstream side relative to the fuel cell stack 20, an anode exhaust gas pipe 61, a gas/liquid separation portion 62, a hydrogen gas circulation pipe 63, a circulating pump 64, an anode drain pipe 65, a drain valve 66, and a pressure measuring portion 67. The anode exhaust gas pipe 61 is a pipe that connects an anode-side outlet of the fuel cell stack 20 to the gas/liquid separation portion 62. The pressure measuring portion 67 is provided in the anode exhaust gas pipe 61. The pressure measuring portion 67 measures a pressure of the anode exhaust gas (an anode-side back pressure of the fuel cell stack 20) around an outlet of a hydrogen manifold of the fuel cell stack 20 and transmits it to the ECU 10.

The gas/liquid separation portion 62 is connected to the hydrogen gas circulation pipe 63 and the anode drain pipe 65. The anode exhaust gas flowing into the gas/liquid separation portion 62 via the anode exhaust gas pipe 61 is separated into a gas component and moisture content by the gas/liquid separation portion 62. In the gas/liquid separation portion 62, the gas component of the anode exhaust gas is guided to the hydrogen gas circulation pipe 63, and the moisture content is guided to the anode drain pipe 65.

The hydrogen gas circulation pipe 63 is connected to a downstream side of the hydrogen gas supply pipe 51 relative to the hydrogen supply device 55. The circulating pump 64 is provided in the hydrogen gas circulation pipe 63. The circulating pump 64 functions as a circulating pump that sends the gas component separated in the gas/liquid separation portion 62 to the hydrogen gas supply pipe 51. While the fuel cell stack 20 is operated, hydrogen is contained in the gas component. Accordingly, by operating the circulating pump 64, hydrogen gas that has not been used by the fuel cell stack 20 can be recirculated to the fuel cell stack 20.

The drain valve 66 is provided in the anode drain pipe 65. The drain valve 66 is opened and closed in response to a command from the ECU 10. The ECU 10 normally closes the drain valve 66, and opens the drain valve 66 at a predetermined drainage timing that is set in advance or a discharge timing of gas in the anode exhaust gas. A downstream end of the anode drain pipe 65 is joined to the cathode exhaust gas pipe 41 so that anode-side waste water and the anode exhaust gas can be discharged in a mixed state with cathode-side waste water and the cathode exhaust gas (not shown).

The refrigerant circulation portion 70 includes a refrigerant pipe 71, a radiator 72, a refrigerant pump 75, and two temperature measuring portions 76a, 76b. The refrigerant pipe 71 is a pipe that circulates a refrigerant that cools off the fuel cell stack 20, and is constituted by an upstream pipe 71a and a downstream pipe 71b. The upstream pipe 71a connects an outlet of a refrigerant passage in the fuel cell stack 20 to an inlet of the radiator 72. The downstream pipe 71l connects an inlet of a refrigerant passage in the fuel cell stack 20 to an outlet of the radiator 72.

The radiator 72 includes a fan that takes in the external air, and performs heat-exchanging between the refrigerant of the refrigerant pipe 71 and the external air, so as to cool down the refrigerant. The refrigerant pump 75 is provided in the downstream pipe 71b, and is driven in response to a command from the ECU 10. The refrigerant flows through the refrigerant pipe 71 by a driving force of the refrigerant pump 75.

A first temperature measuring portion 76a is provided in the upstream pipe 71a, and a second temperature measuring portion 76b is provided in the downstream pipe 71b. The ECU 10 detects refrigerant temperatures in the pipes 71a, 71b by the two temperature measuring portions 76a, 76b, and detects an operating temperature of the fuel cell stack 20 from a difference between the refrigerant temperatures of the pipes 71a, 71b. The ECU 10 controls a rotation number of the refrigerant pump 75 based on an operating temperature of the fuel cell stack 20, so as to control the operating temperature of the fuel cell stack 20 appropriately.

The fuel cell stack 20 generates electric power by use of hydrogen and the air (oxidant gas) supplied by the above configuration. An electrical energy generated herein is supplied to a driving motor (not shown) for driving the vehicle via an inverter (not shown). Further, a high-voltage side of a DC/DC converter 22 is connected to a power line PL (see FIG. 2) through which electric power is supplied to the driving motor from the fuel cell stack 20. The DC/DC converter 22 converts a voltage of the electric power generated by the fuel cell stack 20 into a low voltage to be used by the ECU 10 and the like. A battery 25 is connected to a low-pressure side of the DC/DC converter 22 via a low-voltage power line CL. Accordingly, in the fuel cell system 100 according to the present embodiment, the battery 25 can be charged with surplus electric power other than electric power used for driving the driving motor and the like out of the electric power generated by the fuel cell stack 20, electric power regenerated by the driving motor, or the like electric power. Even in a case where the fuel cell stack 20 stops its operation, if the battery 25 is charged, various parts of the vehicle, e.g., the ECU 10 and the accessories can be operated by electric power of the battery 25.

Figure 2:
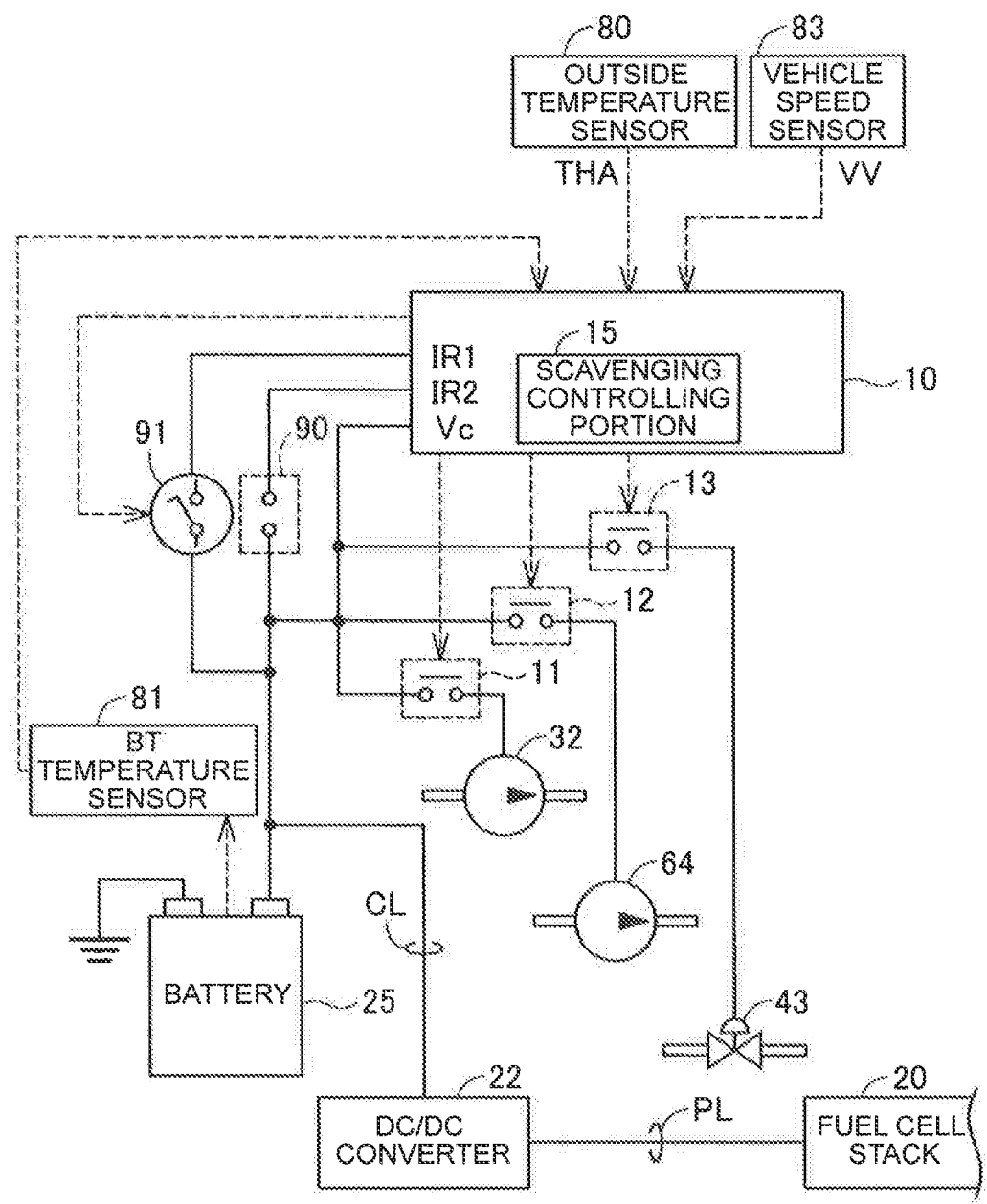
FIG. 2 is an explanatory view schematically illustrating an electrical configuration necessary for a scavenging operation.

The following describes a part of an electric system of a circuit necessary for a scavenging operation performed by the fuel cell system 100. As illustrated in FIG. 2, the fuel cell system 100 includes sensors such as an outside temperature sensor 80, a battery temperature sensor 81 (referred to as a BT temperature sensor in FIG. 2), and a vehicle speed sensor 83, in addition to the ECU 10 and the battery 25. The outside temperature sensor 80 is a sensor for detecting an outside temperature THA of the vehicle, and outputs the outside temperature THA, which is a measurement result, to the ECU10. In the present embodiment, the outside temperature sensor 80 is attached to a backside of a front bumper, but may be provided at any position, provided that a temperature outside the fuel cell vehicle can be detected. The battery temperature sensor 81 is provided on a surface of the battery 25 or in the vicinity thereof, and detects a temperature of the battery 25 and outputs it to the ECU 10. The vehicle speed sensor 83 is a sensor that detects a speed of the vehicle and outputs it to the ECU 10. In the present embodiment, the vehicle speed sensor 83 detects a rotation number of an axle, and detects a vehicle speed VV from the rotation number and outputs it. As a matter of course, the vehicle speed sensor 83 may be realized by a sensor that detects a ground speed, or the like. Further, in the present embodiment, the vehicle speed sensor 83 detects the speed of the vehicle. However, in the present embodiment, it is determined whether or not the vehicle speed is 30 km per an hour or more as will be described later. Accordingly, the vehicle speed sensor 83 may output, to the ECU 10, a signal that can identify whether or not the vehicle speed is 30 km per an hour or more, for example.

In addition, the fuel cell system 100 includes a start switch 90, a parking timer 91, a plurality of relays 11, 12, 13, and the like. The start switch 90 informs the ECU 10 of a request of start/stop of the fuel cell system, and when a predetermined time has passed in a state where the vehicle stops (hereinafter, this state is referred to as "parking"), the parking timer 91 starts the ECU 10. The parking timer 91 starts its operation in response to an instruction from the ECU 10. The start switch 90 and the parking timer 91 are connected to interruption terminals IR2, IR1 of the ECU 10, respectively, so as to output their ON/OFF thereto by using an output voltage of the battery 25 as a signal.

A power line CL from the battery 25 is connected to a power supply terminal Vc of the ECU 10, and is also connected to the air compressor 32, the circulating pump 64, the pressure regulating valve 43, and the like via respective contact points of the relays 11, 12, 13. The relays 11, 12, 13 are connected to the ECU 10, and can be operated by the ECU 10. Accordingly, the ECU 10 can switch on/off the contact points of the relays 11, 12, 13 individually. The ECU 10 and the accessories such as the air compressor 32 are operated upon receiving electric power through the power line CL connected to the battery 25. Accordingly, not only in a case where the fuel cell stack 20 generates electric power, but also in a case where the electric-power generation by the fuel cell stack 20 stops, if the battery 25 has a sufficient remaining capacity; the ECU 10 and the accessories can be operated.

In the configuration illustrated in FIG. 2, the power line CL from the battery 25 is always connected to the ECU 10 and the contact points of the relays 11, 12, 13. Accordingly, the ECU 10 is always operated, and when a signal from the start switch 90 or the parking timer 91 is input therein, the ECU 10 receives the signal as an interruption and executes a predetermined program, thereby starting or stopping the operation of the fuel cell system 100. When the operation of the fuel cell stack 20 is stopped, the ECU 10 turns off functions other than monitoring on the interruption terminals IR1, IR2, so that power consumption by the ECU 10 is minimized. As a matter of course, the power line CL from the battery 25 may be connected to the power supply terminal Vc of the ECU 10 via the start switch 90, the parking timer 91, and the like, and at the time when the fuel cell stack 20 is stopped, power supply to any member other than the parking timer 91 may be cut off, so as to further reduce power consumption of the battery 25.

Next will be described a scavenging operation performed by a scavenging controlling portion 15 of the ECU 10. The fuel cell system 100 having the above configuration executes a stop-time scavenging operation at the time when the operation of the fuel cell stack 20 is stopped, and further, performs a parking scavenging operation at the time of parking of a vehicle equipped with the fuel cell stack 20, if necessary. The reason why such scavenging operations are performed is as follows.

As described above, each single cell 21 of the fuel cell stack 20 includes an electrolyte membrane exhibiting a good proton conductivity in a wet state. Accordingly, during the operation of the fuel cell stack 20, an inner part of the fuel cell stack 20 is maintained in a moderate wet state. Accordingly, in a case where the operation of the fuel cell stack 20 is stopped, it is anticipated that such a situation might occur that moisture content remains inside the fuel cell stack 20 or inside its connection pipe and is frozen due to exposure to a low-temperature environment below the freezing point. When freezing occurs in the fuel cell stack 20 or a duct, the following cases are anticipated. That is, when the fuel cell stack 20 generates electric power next time, a flow of fuel gas or the air is obstructed so that the electric-power generation cannot be performed or each single cell 21 in the fuel cell stack 20 might deteriorate. Accordingly, when there is a possibility of freezing, it is desirable to remove the moisture content generated due to the operation of the fuel cell stack 20. This is the reason to perform an operation to remove the moisture content by supplying the gas so as to remove the moisture content remaining in the fuel cell stack or the like, that is, the reason to perform the scavenging operation.

Figure 3:
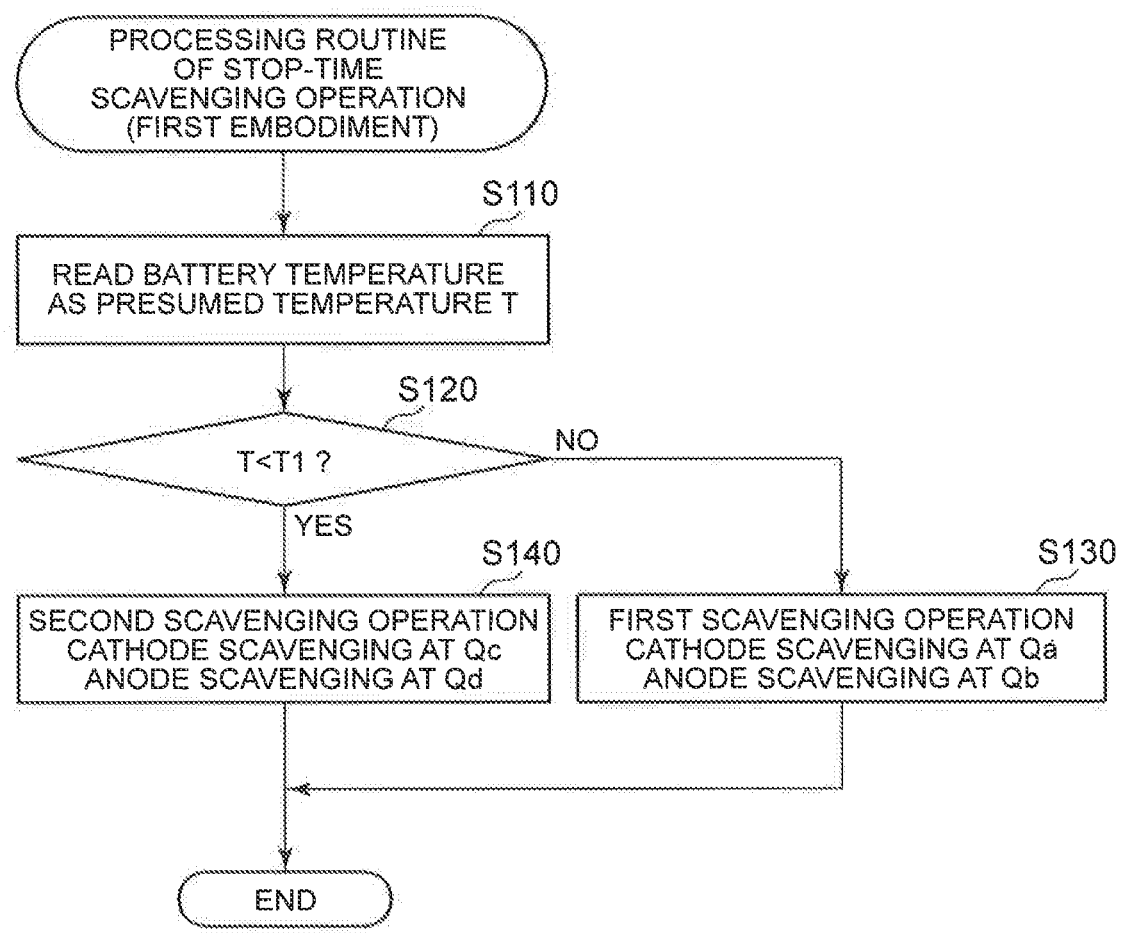
FIG. 3 is a flowchart illustrating a processing routine of a stop-time scavenging operation in a first embodiment.

A scavenging operation performed by the fuel cell system 100 as the first embodiment is described with reference to FIG. 3. FIG. 3 is a flowchart illustrating a processing routine of a stop-time scavenging operation in the first embodiment. This processing routine is executed at the same time as an operation stop of the fuel cell stack 20 when the ECU 10 detects that the start switch 90 is turned off, based on a signal input into the interruption terminal IR2. A process as the scavenging controlling portion 15 is realized by executing this processing routine. Note that the process routine of the stop-time scavenging operation at the time of the operation stop of the fuel cell stack 20 is performed while the electric power from the fuel cell stack 20 is supplied to the low-voltage power line CL via the DC/DC converter 22.

When the process illustrated in FIG. 3 is started by turning off the start switch 90, a process of reading a temperature of the battery 25 is first performed by reading a signal from the battery temperature sensor 81 (step S110). In the present embodiment, the temperature of the battery 25 at the time when the operation of the fuel cell stack 20 is stopped is treated as a presumed temperature T that the battery 25 is presumed to reach during the stop of the fuel cell stack 20. Accordingly, this process corresponds to a process of the temperature acquisition portion that acquires a presumed temperature that the temperature of the battery 25 is presumed to reach during the operation stop of the fuel cell stack 20.

Subsequently, it is determined whether or not the presumed temperature T of the battery 25 is less than a predetermined temperature T1 (step S120). The predetermined temperature T1 is a temperature that is set in advance as a temperature at which the battery 25 may not be able to supply sufficient electric power. In the present embodiment, the predetermined temperature T1 is −10° C. When it is determined that the presumed temperature T of the battery 25 is not less than the predetermined temperature T1 (step S120: "NO"), a first scavenging operation is performed (step S130). In the meantime, when it is determined that the presumed temperature T of the battery 25 is less than the predetermined temperature T1 (step S120: "YES"), a second scavenging operation is performed (step S140). After these scavenging operations are performed, the processing routine proceeds to "END" to be finished herein.

The first scavenging operation is an operation to scavenge the cathode at a scavenging amount Qa and to scavenge the anode at a scavenging amount Qb. The second scavenging operation is an operation to scavenge the cathode at a scavenging amount Qc and to scavenge the anode at a scavenging amount Qd. Here, the scavenging amount indicates an amount of gas passing through the cathode and the anode of the fuel cell stack 20, and a relationship of Qc>Qa, Qd>Qb is established. That is, a scavenging ability of the second scavenging operation is higher than that of the first scavenging operation, Note that the scavenging ability of the second scavenging operation should be better than that of the first scavenging operation, and the second scavenging operation may perform scavenging for the same period of time as the first scavenging operation by increasing a scavenging amount per unit time, or the second scavenging operation may perform scavenging for a longer time than the first scavenging operation by setting a scavenging amount per unit time to be equivalent to that of the first scavenging operation. Alternatively, both may be combined.

The scavenging on the cathode side is performed such that the relays 11, 13 are driven to close respective contact points, the air compressor 32 is driven, and the pressure regulating valve 43 is set to a fully opening state accordingly. By performing the cathode-side scavenging, scavenging of the moisture content in a cathode-side passage of the fuel cell stack 20 and scavenging of the moisture content in the pressure regulating valve 43 are performed. Hereby, such a situation is avoided that, while the operation of the fuel cell stack 20 is stopped, the moisture content in the passage in the fuel cell stack 20 is frozen so as to partially or fully close the cathode-side passage and prevent electric-power generation at the time when the fuel cell stack 20 is started next time. Further, it is also possible to avoid such a situation that the pressure regulating valve 43 is stuck due to freezing and the adjustment of an amount of the air (the oxidant gas) cannot be performed properly.

In the meantime, the scavenging on the anode side is performed such that the relay 12 is driven to close its contact point and the circulating pump 64 is driven. By performing the anode-side scavenging, scavenging of the moisture content in an anode-side passage of the fuel cell stack 20 is performed. Hereby, such a situation is avoided that, while the operation of the fuel cell stack 20 is stopped, water in the circulating pump 64 that circulates hydrogen is circulated through the anode-side passage and then frozen so as to partially or fully close the anode-side passage and prevent electric-power generation at the time when the fuel cell stack 20 is started next time. The cathode-side scavenging and the anode-side scavenging are performed in this order in general, but they may be performed in a reverse order to the above depending on a state of the fuel cell stack 20. Further, they can be partially or fully performed at the same time.

According to the first embodiment described above, the fuel cell system 100 performs the stop-time scavenging operation at the time when the operation of the fuel cell stack 20 is stopped, and when the presumed temperature T that the temperature of the battery 25 is presumed to reach at the time when the fuel cell stack 20 is stopped is less than the predetermined temperature T1, the second scavenging operation having a high scavenging ability is performed as compared with a case where the presumed temperature T is the predetermined temperature T1 or more. Accordingly, at the time of the stop of the fuel cell stack 20, strong scavenging is performed so as to completely drain off the moisture content of the fuel cell stack 20, its peripheral duct, the pump, or the like. Accordingly, it is not necessary to perform scavenging by use of the battery 25 in a state where the presumed temperature T of the battery 25 becomes less than the predetermined temperature T1 during the stop of the fuel cell stack 20 and discharge of the battery 25 causes deterioration of the battery 25. As a result, it is possible to avoid the deterioration of the battery 25 and also possible to maintain high durability and high reliability as the fuel cell system 100. Further, in the above embodiment, when the presumed temperature T of the battery 25 is the predetermined temperature T1 or more, the first scavenging operation having a lower scavenging ability than the second scavenging operation is performed. Accordingly, the time for the stop-time scavenging operation is not necessarily made long in a case where the possibility of the freezing is low, and besides, a load to the battery 25 is not increased, so that convenience for a user is not lost.

In the above embodiment, the temperature detected by the battery temperature sensor 81 is treated as the presumed temperature T that the temperature of the battery 25 is presumed to reach during the operation stop of the fuel cell stack 20. The reason is as follows. That is, in a case of a temperature of −10° C. or less, which is severe cold, if moisture content remains in the fuel cell stack 20 or the like, the moisture content is frozen in a short time. Accordingly, it is possible to treat a battery temperature measured by the battery temperature sensor 81 as the presumed temperature T so as to determine which one is used as the stop-time scavenging operation, the first scavenging operation or the second scavenging operation.

Next will be described a second embodiment of the present disclosure with reference to FIG. 4. A fuel cell system 100 of the second embodiment has the same hardware configuration as the first embodiment, and an operation control on a fuel cell stack 20 and the like is also similar to the first embodiment. Similarly to the first embodiment, when a start switch 90 is turned off, the fuel cell system 100 according to the second embodiment executes a processing routine of a stop-time scavenging operation. This processing routine (FIG. 4) is the same as the first embodiment except for step S150 performed following step S130 and step S160 performed following step S140, so descriptions about processes from step S110 to S140 are omitted.

In the fuel cell system 100 according to the second embodiment, a process of setting a parking timer 91 (step S150) is performed following a process of a first scavenging operation (step S130). This process is a process in which the parking timer 91 is turned on a predetermined time later after the fuel cell stack 20 is stopped, and the parking timer 91 is set to start an ECU 10. The predetermined time is five hours, for example.

In the meantime, when a second scavenging operation (step S140) is performed, a process of stopping the parking timer 91 or maintaining the stop thereof is performed after that (step S160). As a result, the parking timer 91 enters a stop state, so that a function to start the ECU 10 after the predetermined time does not work.

Thus, by the processing routine of the stop-time scavenging operation, when it is determined that a presumed temperature T of a battery 25 is a predetermined temperature T1 or more, the parking timer 91 is set after the first scavenging operation. Accordingly, after the operation of the fuel cell stack 20 is finished, when the predetermined time elapses, the parking timer 91 is turned on, so that the ECU 10 executes a processing routine of a parking scavenging operation illustrated in FIG. 5. When the ECU 10 performs this process, a function as a scavenging controlling portion 15 in the second embodiment is realized.

Figures 5, 6:
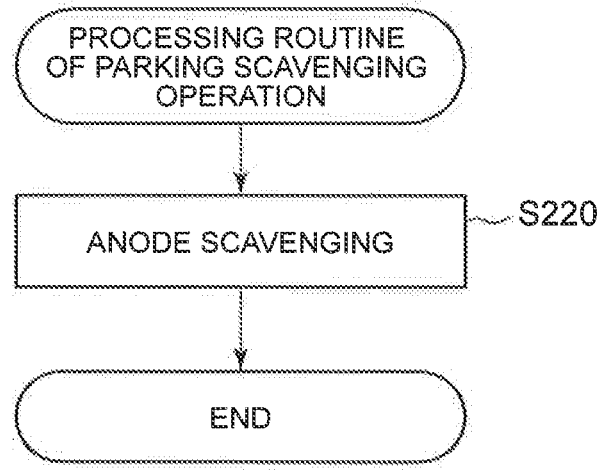
FIG. 5 is a flowchart illustrating a processing routine of a parking scavenging operation in the second embodiment.
FIG. 6 is an explanatory view illustrating a relationship between a temperature and a scavenging operation at the time of a vehicle stop in the second embodiment.

When the processing routine illustrated in FIG. 5 is started, the ECU 10 executes anode scavenging (step S220). The anode scavenging is similar to anode scavenging in the first scavenging operation, and is performed such that a relay 12 is driven to close its contact point and a circulating pump 64 is driven so as to circulate gas through an anode side of the fuel cell stack 20. A scavenging amount at this time may be the same as a scavenging amount Qb of a first scavenging ability in the stop-time scavenging operation, or may be different from that. Whether the scavenging amount is set to be the scavenging amount Qb or more, or to be set smaller than the scavenging amount Qb should be set based on the configuration of the fuel cell system 100. After the above process is performed, the processing routine proceeds to "END," and hereby, the processing routine of the parking scavenging operation is finished. The parking timer 91 may be set after the anode scavenging, so as to restart the processing routine of the parking scavenging operation illustrated in FIG. 5 after a predetermined time elapses.

Figure 4:
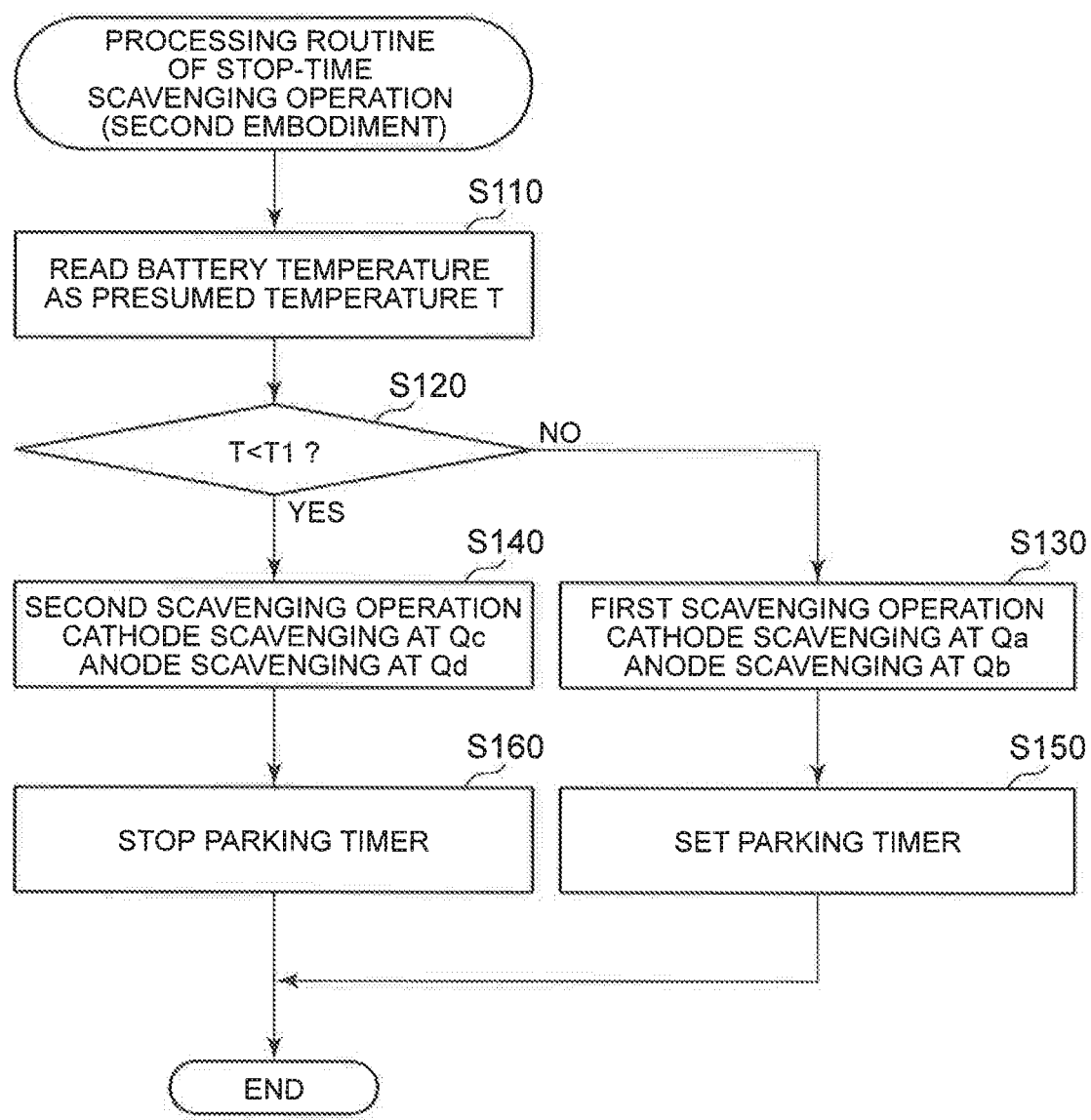
FIG. 4 is a flowchart illustrating a processing routine of a stop-time scavenging operation in a second embodiment.

The fuel cell system 100 according to the second embodiment as described above performs the stop-time scavenging operation illustrated in FIG. 4 and the parking scavenging operation illustrated in FIG. 5. Scavenging realized by both of the scavenging operations is summarized in FIG. 6. As illustrated herein, in the second embodiment, when the presumed temperature T of the battery 25 is less than the predetermined temperature T1, scavenging is performed on the cathode side and the anode side with a second scavenging ability at the time of the stop of the fuel cell stack 20, but the parking scavenging operation is not performed. In the meantime, when the presumed temperature T is the predetermined temperature T1 or more, the scavenging is performed on the cathode side and the anode side with the first scavenging ability at the time of the stop of the fuel cell stack 20, and after a predetermined time from the operation stop of the fuel cell stack 20, the scavenging is performed on the anode side as the parking scavenging operation. A relationship between a scavenging amount Qa of cathode scavenging by the air supply with the first scavenging ability, a scavenging amount Qb of anode scavenging by air circulation, a scavenging amount Qc of cathode scavenging by the air supply with the second scavenging ability, and a scavenging amount Qd of anode scavenging by air circulation satisfies Qc>Qa, Qd>Qb. The second scavenging ability in the stop-time scavenging operation is higher than the first scavenging ability similarly to the first embodiment.

Accordingly, in the fuel cell system 100 according to the second embodiment, when the presumed temperature T that the temperature of the battery 25 is presumed to reach during the operation stop of the fuel cell stack 20 is less than the predetermined temperature T1, the scavenging operation is not performed only by electric power of the battery 25 during the stop of the fuel cell stack 20. On this account, the battery 25 in a very low temperature does not perform discharge, so that a possibility to cause deterioration of the battery 25 can be reduced. As a result, it is possible to increase reliability of the whole fuel cell system 100. Besides, in this case, at the time of the stop of the fuel cell stack 20, scavenging of the fuel cell stack 20 is performed with the second scavenging ability which is higher than the first scavenging ability. Accordingly, it is possible to reduce a possibility that moisture content remaining in the fuel cell stack 20 is frozen during the stop of the fuel cell stack 20. Further, in the above embodiment, when the presumed temperature T of the battery 25 is the predetermined temperature T1 or more, the first scavenging operation having a lower scavenging ability than that of the second scavenging operation is performed. Accordingly, the time for the stop-time scavenging operation is not necessarily made long in a case where the possibility of the freezing is low, and besides, a load to the battery 25 is not increased, so that convenience for a user is not lost.

In the meantime, in a case where the presumed temperature T that the temperature of the battery 25 is presumed to reach during the operation stop of the fuel cell stack 20 is not less than the predetermined temperature T1, the stop-time scavenging operation is performed with the first scavenging ability at the time of when the fuel cell stack 20 is stopped, and after a predetermined time elapses, the parking scavenging operation is performed. As the parking scavenging operation, scavenging is performed on the anode side of the fuel cell stack 20. Accordingly, due to the execution of the parking scavenging operation, it is possible to more surely avoid freezing of the moisture content in the fuel cell stack 20 during the stop of the fuel cell stack 20. The parking scavenging operation is performed by use of electric power of the battery 25. The presumed temperature T of the battery 25 at this time is determined to be the predetermined temperature T1 or more, so the battery 25 is less likely to deteriorate due to discharge. As a result, it is possible to restrain the possibility to deteriorate the battery 25, and eventually to maintain high durability and high reliability of the fuel cell system 100.

Next will be described a third embodiment of the present disclosure. A fuel cell system 100 of the third embodiment has the same hardware configuration as the first and second embodiments, but is different from them in a scavenging operation. Further, in the third embodiment, a process called a "winter determination" is performed prior to the scavenging operation. The "winter determination" is a process as follows. That is, an environment where the fuel cell system 100 is used is a so-called winter season, and it is determined whether or not it is more likely to become an environment where moisture content in a fuel cell stack 20 is frozen in the night or the like, for example, after a vehicle is stopped. When the winter determination is "ON," it means that it is determined that it is a season in which the freezing is very likely to occur during a vehicle stop, and when the winter determination is "OFF," it means that it is determined that it is a season other than the winter.

Figure 7:
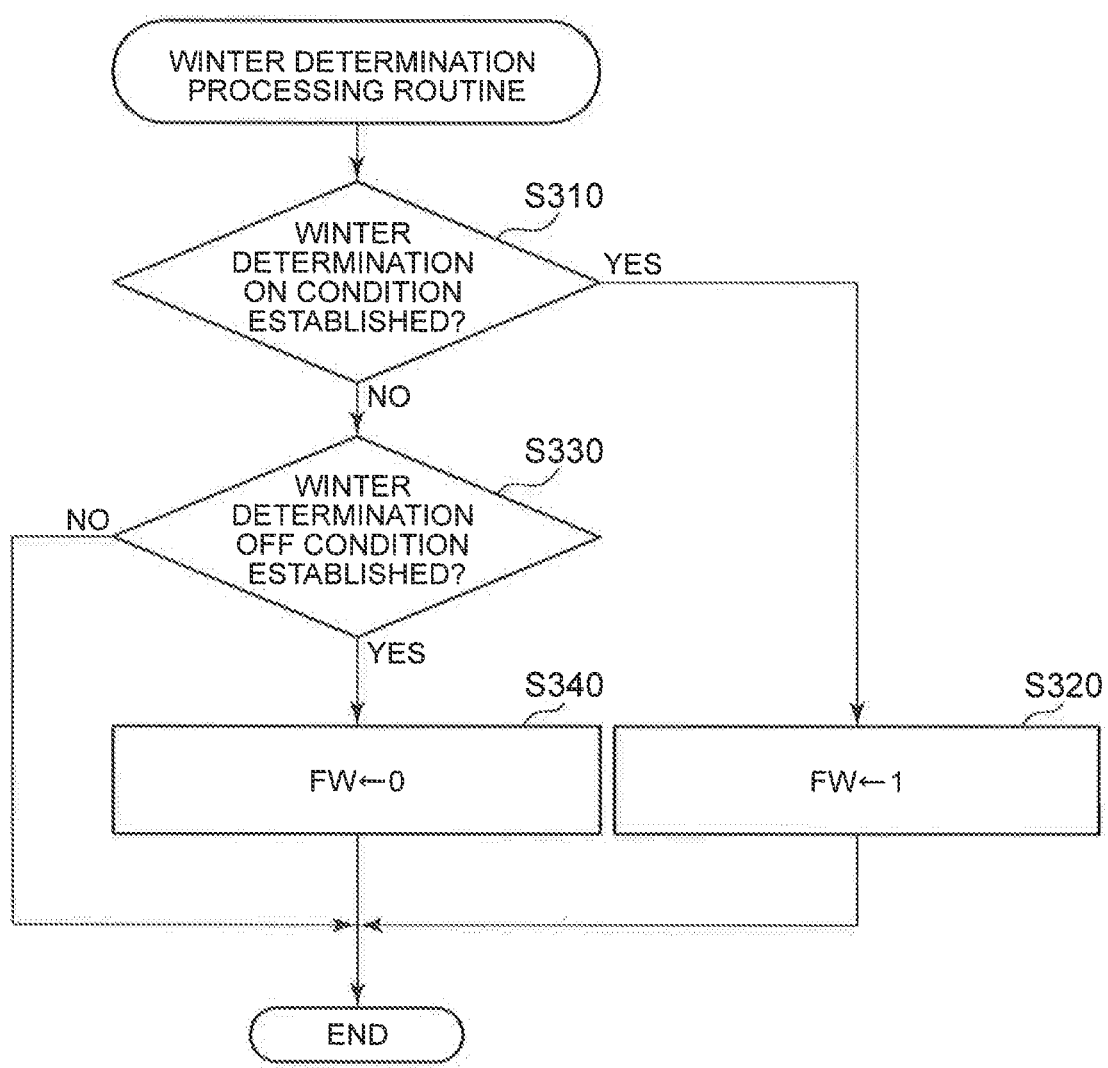
FIG. 7 is a flowchart illustrating a winter determination processing routine in a third embodiment.

In the fuel cell system 100 according to the third embodiment, when a start switch 90 is turned on, a winter determination processing routine illustrated in FIG. 7 is repeatedly executed at a predetermined interval. When the process is started, it is first determined whether or not a winter determination ON condition is established (step S310). The winter determination ON condition in this embodiment means that either of the following conditions is satisfied: (a) a state where an outside temperature THA detected by an outside temperature sensor 80 is −10° C. or less continues for three seconds or more; and (b) a history that a parking scavenging operation is performed is left in a storage device of an ECU 10. If either of the conditions is satisfied, it is determined that the winter determination ON condition is satisfied, and the processing routine shifts to step S320, in which a winter determination flag FW is set to a value 1. The winter determination flag FW is stored in the storage device of the ECU 10.

In the meantime, when it is determined that the winter determination ON condition is not established, it is subsequently determined whether or not a winter determination OFF condition is established (step S330). The winter determination OFF condition in this embodiment is such that the following condition (c) is satisfied: (c) the outside temperature THA detected by the outside temperature sensor 80 is 5° C. or more over 120 seconds or more when a vehicle speed VV detected by a vehicle speed sensor 83 is 30 km per an hour or more. At this time, it is determined that the winter determination OFF condition is established, and the processing routine shifts to step S340 to reset the winter determination flag FW to a value 0. Although not illustrated herein, the history that the parking scavenging operation is performed, left in the storage device of the ECU 10, is deleted at this time.

After the winter determination flag FW is set to the value 1 or 0 in step S320, S340, or when a determination in step S330 is "NO," the processing routine proceeds to "END" so as to be finished herein.

While the start switch 90 is turned on, the processing routine illustrated in FIG. 7 is performed repeatedly. However, once the winter determination ON condition is established, the winter determination flag FW is maintained at the value 1 until the winter determination OFF condition is established. Similarly, once the winter determination OFF condition is established, the winter determination flag FW is maintained at the value 0 until the winter determination ON condition is established. A function as a winter determination portion is realized by performing such a process in the ECU 10.

Figure 8:
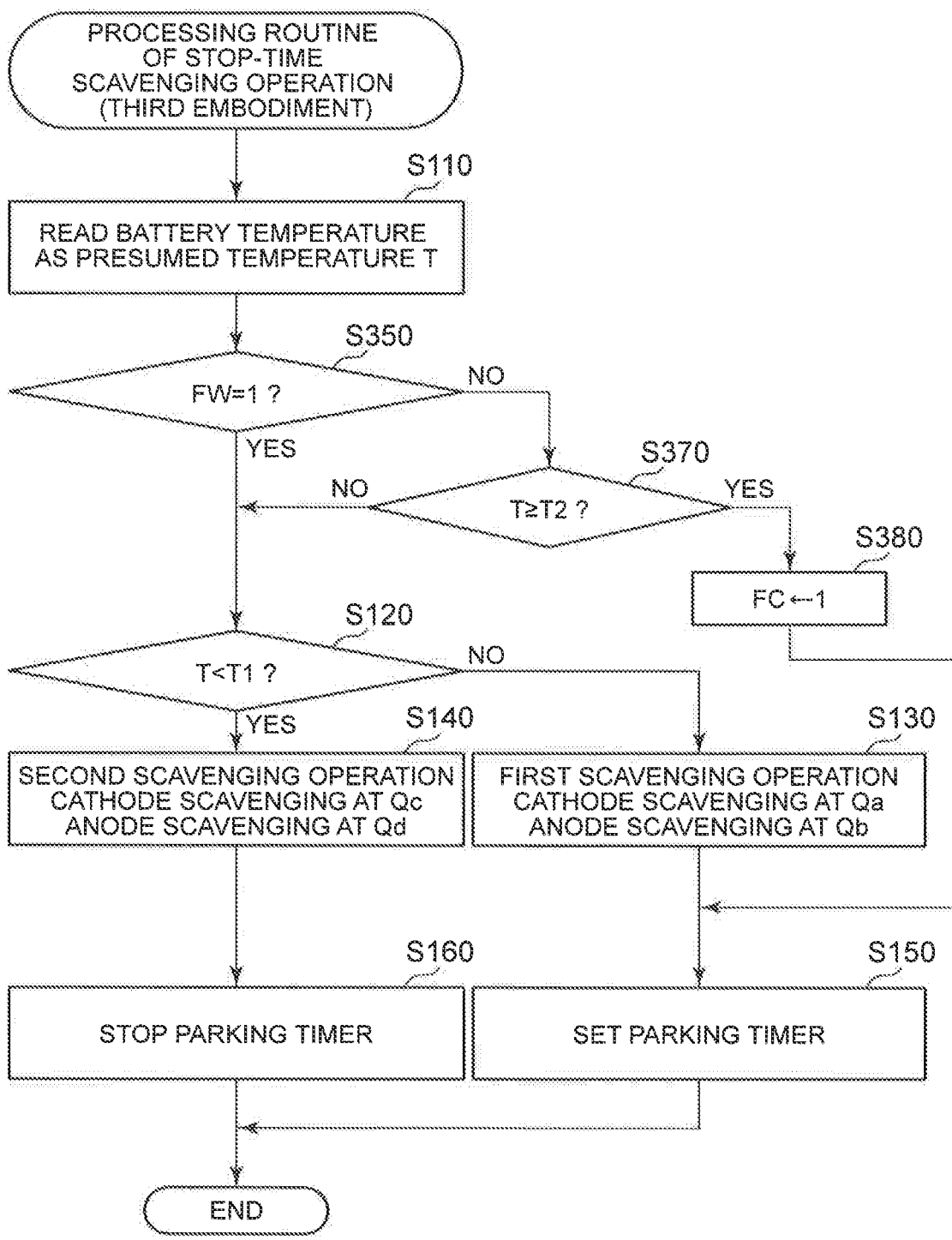
FIG. 8 is a flowchart illustrating a processing routine of a stop-time scavenging operation in the third embodiment.
Figure 9:
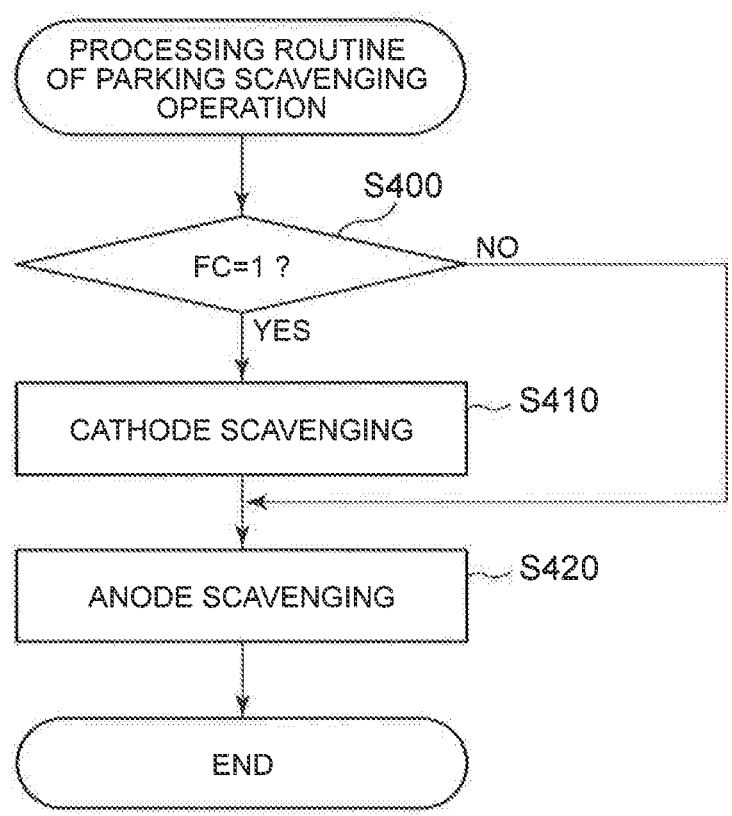
FIG. 9 is a flowchart illustrating a processing routine of a parking scavenging operation in the third embodiment.

Next will be described a stop-time scavenging operation and a parking scavenging operation in the third embodiment. FIG. 8 is a flowchart illustrating a processing routine of the stop-time scavenging operation in the third embodiment, and FIG. 9 is a flowchart illustrating a processing routine of the parking scavenging operation in the third embodiment. In the processing routine of the stop-time scavenging operation illustrated in FIG. 8, processes similar to the second embodiment are indicated by use of the same step numbers S110 to S160. A description on the same process is omitted or made simply.

The processing routine of the stop-time scavenging operation illustrated in FIG. 8 is executed when the start switch 90 is turned off and the operation of the fuel cell stack 20 is stopped. In the third embodiment, a temperature T of a battery 25 is read by a battery temperature sensor 81 (step S110), and after that, it is determined whether or not the winter determination flag FW is the value 1 (step S350). When it is determined that the winter determination flag FW is the value 1, it is determined whether or not a presumed temperature T is less than a predetermined temperature T1 (step S120), similarly to the second embodiment. Then, respective processes of a first scavenging operation (step S130), setting of a parking timer 91 (step S150), a second scavenging operation (step S140), and stop of the parking timer 91 (step S160) are performed.

In the meantime, if the winter determination flag FW is not the value 1 in step S350, it is determined whether or not the presumed temperature T of the battery 25 is a threshold temperature T2 (e.g., +5° C.) or more (step S370). The threshold temperature T2 is higher than the predetermined temperature T1. If the presumed temperature T is not the threshold temperature T2 or more (step S370: "NO"), the processing routine shifts to step S120 again, and the above processes (from step S120 to S160) are performed. In the meantime if the presumed temperature T is the threshold temperature T2 or more (step S370: "YES"), a cathode scavenging flag FC is set to a value 1, and then, the processing routine shifts to step S150, in which the parking timer 91 is set. After the setting of the parking timer 91 (step S150) or the stop of the parking timer 91 (step S160), the processing routine proceeds to "END" and is finished. Although not illustrated herein, when the first or second scavenging operation (step S130 or S140) is performed, the cathode scavenging flag FC is reset to a value 0.

Next will be described the processing routine of the parking scavenging operation with reference to FIG. 9. When a predetermined time set in step S150 of the processing routine of the stop-time scavenging operation elapses, the parking timer 91 is turned on, so that the ECU 10 executes the processing routine of the parking scavenging operation illustrated in FIG. 9. In this processing routine, it is first determined whether or not the cathode scavenging flag FC is the value 1 (step S400). As illustrated in FIG. 8, when the winter determination OFF condition is established (FW≠1) and the presumed temperature T of the battery 25 is the threshold temperature T2 or more, the cathode scavenging flag FC is set to the value 1. Besides, in this case, the processes of step S130 and step S140 of FIG. 8 are not performed, so when the cathode scavenging flag FC is set to the value 1, it means that the stop-time scavenging operation is not performed. Accordingly, when the cathode scavenging flag FC is set to the value 1, the scavenging on the cathode side of fuel cell stack 20 is performed (step S410), and after that, the scavenging on the anode side is performed (step S420). In the meantime, when the cathode scavenging flag FC is not set to the value 1 (step S400: "NO"), the scavenging on the cathode side (step S410) is not performed, but the scavenging on the anode side (step S420) is performed. After that, the processing routine proceeds to "END," and hereby, the processing routine of the parking scavenging operation is finished. Although not illustrated herein, after step S420 is finished, a history indicating that the parking scavenging operation has been performed is stored in the storage device of the ECU 10, so as to be used for the determination of (b) described above.

The scavenging operation in the third embodiment described above is summarized in FIG. 10. FIG. 10 illustrates how the stop-time scavenging operation and the parking scavenging operation are performed in the following cases depending on conditions of the presumed temperature of the battery 25: a case where the winter determination ON condition is established; and a case where the winter determination OFF condition is established. As illustrated herein, when the presumed temperature T is less than the threshold temperature T2, the stop-time scavenging operation and the parking scavenging operation are the same regardless of a result of the winter determination as follows: when the presumed temperature T is not less than the predetermined temperature T1 but less than the threshold temperature 12, the stop-time scavenging operation is performed with a first scavenging ability, and the anode-side scavenging is performed as the parking scavenging operation; and when the presumed temperature T is less than the predetermined temperature T1, the stop-time scavenging operation is performed with a second scavenging ability higher than the first scavenging ability, and the parking scavenging operation is not performed.

In the meantime, when the presumed temperature T is not less than the threshold temperature T2, the scavenging operation is performed as follows: when the winter determination ON condition is established, the stop-time scavenging operation is performed with the first scavenging ability, and the anode-side scavenging is performed as the parking scavenging operation; and when the winter determination OFF condition is established, the stop-time scavenging operation is not performed, but the cathode-side scavenging and the anode-side scavenging are performed as the parking scavenging operation. A relationship between a scavenging amount Qa of cathode scavenging by the air supply with the first scavenging ability, a scavenging amount Qb of anode scavenging by air circulation, a scavenging amount Qc of cathode scavenging by the air supply with the second scavenging ability, and a scavenging amount Qd of anode scavenging by air circulation satisfies Qc>Qa, Qd>Qb. Note that scavenging amounts of the cathode-side scavenging and the anode-side scavenging in the parking scavenging operation may be the same as scavenging amounts of the cathode-side scavenging and the anode-side scavenging in the stop-time scavenging operation, or may be different therefrom, similarly to the second embodiment.

According to the third embodiment described above, it is possible to yield the same effect as in the second embodiment, and further, a seasonal condition like the winter determination is further added, so that, under the condition that the presumed temperature T is the threshold temperature T2 or more, it is determined that there is less possibility of freezing, and the stop-time scavenging operation is not performed. Accordingly, electric power required for the stop-time scavenging operation can be restrained. Based on that, the cathode-side scavenging and the anode-side scavenging are performed in the parking scavenging operation. Accordingly, most of the moisture content in the fuel cell stack 20 can be removed by the cathode-side scavenging having a high drainage performance, and residual moisture content can be further removed by the anode-side scavenging. This prevents such a situation that, at the time when the operation of the fuel cell stack 20 is started next time, each single cell 21 is too humid and it takes much time to increase power generation efficiency. As a result, the fuel cell system 100 can eventually increase the operating efficiency of the vehicle.

Modifications: Some embodiments of the present disclosure have been described above, but the present disclosure is not limited to those embodiments and is performable in various embodiments. Some of the other embodiments are described as modifications.

First Modification: In the above embodiments, the temperature of the battery 25 at the time when the operation of the fuel cell stack 20 is stopped is used as the presumed temperature T of the battery 25. The reason is as follows. That is, the presumed temperature T is a temperature that the temperature of the battery 25 is presumed to reach when the operation of the fuel cell stack 20 is stopped for a predetermined period. Accordingly, when the predetermined period is short, the temperature of the battery 25 at the time of the stop of the fuel cell stack 20 may be usable.

The presumed temperature T may be set by the following technique.

Figure 11:
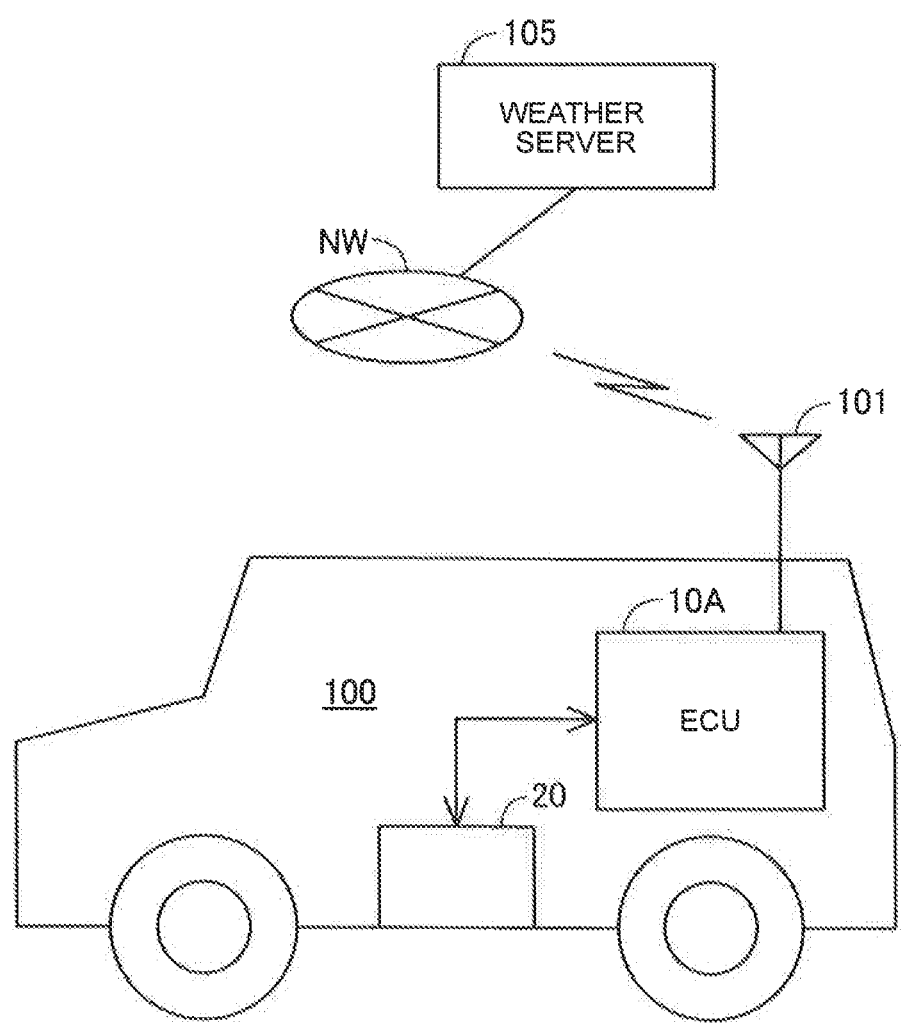
FIG. 11 is an explanatory view illustrating another embodiment in which a presumed temperature of a battery during a vehicle stop is acquired.

(1) An outside temperature after a set time of the parking timer 91 is acquired from an external weather server or the like, and the outside temperature thus acquired is treated as the presumed temperature T. For example, as illustrated in FIG. 11, an ECU 10A of a fuel cell system 100 may have a communication function, so that by means of wireless communication via an antenna 101, an expected temperature within a predetermined time (e.g., 24 hours) is acquired from a weather server 105 through a network NW such as existing VICS (registered trademark), LTE, or the like, so as to set the presumed temperature T. With such a configuration, it is possible to increase accuracy at the time when the presumed temperature T of the battery 25 is acquired while the fuel cell stack 20 is stopped, and it is possible to determine, with accuracy, how the stop-time scavenging operation and the parking scavenging operation, if necessary, are performed.

(2) Outside temperatures THA before the fuel cell stack 20 is stopped are acquired sequentially (e.g., every one hour) and stored in the storage device of the ECU10. The presumed temperature T of the battery 25 during the operation stop of the fuel cell stack 20 is determined by being presumed from a history (a temperature and its acquisition time) of the outside temperatures THA. A temperature change of one day can be patternized to some extent, so it is possible to predict and determine, with accuracy, a presumed temperature that the temperature of the battery 25 is presumed to reach. The acquisition of such a presumed temperature may be performed further in consideration of information such as a time and a season when the operation of the fuel cell stack 20 is stopped. If data about an average temperature for each time of the day or an average temperature per season is used, it is possible to improve accuracy of acquisition of the presumed temperature. Such data may be stored in the storage device of the ECU 10 in advance or may be acquired from an external site or the like such as the weather server 105 by use of the configuration illustrated in FIG. 11.

(3) A temperature of the battery 25 in a state where the fuel cell stack 20 is operated and a temperature of the battery 25 in a state where the operation of the fuel cell stack 20 is stopped are measured, and a correlation therebetween is found in advance. Then, the presumed temperature T of the battery 25 after the operation of the fuel cell stack 20 is stopped is determined according to this correlation. For example, in a case where it is found that a temperature of the battery 25 during the operation of the fuel cell stack 20 is higher than a temperature thereof after the operation stop of the fuel cell stack 20 only by a predetermined temperature, a temperature (Tb−ΔT) that is lower than a temperature Tb of the battery 25 at the time of the stop of the fuel cell stack 20 only by a difference temperature ΔT determined in advance may be set as the presumed temperature T.

Modification 2: In the second and third embodiments, when the stop-time scavenging operation is performed with the second scavenging ability, the parking timer 91 is stopped. However, in the processing routine of the stop-time scavenging operation, the parking timer 91 may not be stopped, and that the stop-time scavenging operation has been performed with the second scavenging ability may be just stored as a history in the storage device of the ECU 10. In this case, after the parking timer 91 is turned on so that the ECU 10 starts the processing routine of the parking scavenging operation, the history is referred to, and if the stop-time scavenging operation is performed with the second scavenging ability, nothing should be performed as the parking scavenging operation.

In the second and third embodiments, when the stop-time scavenging operation is performed with the second scavenging ability, the parking scavenging operation is not performed. However, the scavenging operation using electric power of the battery 25 may be performed only for a short time which does not cause deterioration of the battery 25 or which causes deterioration that can be ignored.

Other Modifications: In the third embodiment, in a case where the stop-time scavenging operation is not performed, the cathode scavenging flag FC is set to the value 1 and the scavenging is performed not only on the anode side but also on the cathode side in the parking scavenging operation. However, the scavenging on the cathode side may not be performed. Further, when the winter determination OFF condition is established and the presumed temperature T of the battery 25 is the threshold temperature T2 or more, the stop-time scavenging operation may be performed only for a short time.

In terms of the first scavenging ability and the second scavenging ability, the second scavenging ability should be set higher than the first scavenging ability. However, their scavenging amounts per unit time and their scavenging times may not be determined, but a frequency impedance of each single cell 21 of the fuel cell stack 20 may be measured, so that the scavenging is performed until a moisture content estimated from the frequency impedance reaches a target value or less. By changing the target value, the scavenging ability in the second scavenging operation may eventually become higher than the scavenging ability in the first scavenging operation. Further, the second scavenging ability higher than the first scavenging ability may be realized by changing a pressure loss of a passage through which gas for the scavenging passes, not by the control on the air compressor 32 side.

Whether the winter determination ON condition and the winter determination OFF condition are established or not may be determined based on various conditions. For example, the ECU 10 may have a function of a real-time calendar, and a season (a season when an outside temperature is below zero) of a region where the vehicle runs may be added to a determination condition. Further, as illustrated in FIG. 11, the external weather server 105 or the like may perform the winter determination from a weather condition of a region where a vehicle that inquires of the weather server 105 is used. In this case, the winter determination may be performed without considering the history of the parking scavenging operation.

The second embodiment may be modified such that, at the time when the operation of the fuel cell stack 20 is stopped, the presumed temperature T of the battery 25 is compared with the threshold temperature T2 higher than the predetermined temperature T1 as described in the third embodiment, and when the presumed temperature T is higher than the threshold temperature T2, the stop-time scavenging operation may not be performed. In this case, it is not necessary to determine the establishment of the winter determination ON condition and the winter determination OFF condition, and it is possible to easily omit the stop-time scavenging operation.

The above embodiments and the modifications deal with a case where the fuel cell system is provided in the vehicle, but the fuel cell system is not necessarily limited to one to be provided in the vehicle. For example, the fuel cell system may be provided in other movable bodies such as a two-wheeled vehicle, a vessel, and a train. Further, the fuel cell system is also applicable to a fuel cell system provided in a house and the like, provided that the fuel cell system performs an operation by electric power of a battery while its fuel cells are stopped.

In the above embodiments and modifications, a target for the scavenging includes not only the fuel cell stack but also the peripheral duct, the pump, the pressure regulating valve, and the like. However, the target for the scavenging in the present disclosure may be limited to some of them.

What is claimed is:

1. A fuel cell system comprising:
   a battery configured to supply electric power at least during an operation stop of a fuel cell;
   a temperature sensor configured to detect the temperature of the battery;
   a gas supply portion configured to receive the electric power supplied from the battery and supply gas to the fuel cell;
   a temperature acquisition portion configured to acquire, from the temperature sensor, the temperature of the battery during the operation stop of the fuel cell; and
   a scavenging controlling portion programmed to control the supply of the gas to the fuel cell from the gas supply portion at the time of the operation stop of the fuel cell, and perform a stop-time scavenging operation to scavenge the fuel cell, wherein the scavenging controlling portion is programmed to:
      when it is determined that the temperature of the battery is equal to or greater than a predetermined temperature at the time of the operation stop of the fuel cell, perform the stop-time scavenging operation with a first scavenging ability providing a first amount of gas supplied to the fuel cell throughout the stop-time scavenging operation; and
      when it is determined that the temperature of the battery is less than the predetermined temperature at the time of the operation stop of the fuel cell, perform the stop-time scavenging operation with a second scavenging ability providing a second amount of gas supplied to the fuel cell throughout the stop-time scavenging operation, the second amount of gas being larger than the first amount of gas.

2. The fuel cell system according to claim 1, wherein the scavenging controlling portion is further programmed to:
   when the operation of the fuel cell is stopped, control the supply of the gas from the gas supply portion to the fuel cell at a predetermined timing during the operation stop of the fuel cell, and perform a parking scavenging operation of scavenging the fuel cell;
   when it is determined that the temperature of the battery during the operation stop of the fuel cell is equal to or greater than the predetermined temperature, perform the parking scavenging operation; and
   when it is determined that the temperature of the battery during the operation stop of the fuel cell is less than the predetermined temperature, not perform the parking scavenging operation.

3. The fuel cell system according to claim 2, wherein:
   when it is determined that the temperature of the battery during the operation stop of the fuel cell is not less than a threshold temperature higher than the predetermined temperature, the scavenging controlling portion is programmed not to perform the stop-time scavenging operation.

4. The fuel cell system according to claim 2, wherein:
   the scavenging controlling portion is programmed to determine whether or not a predetermined condition under which the fuel cell is frozen is satisfied; and
   at the time of the operation stop of the fuel cell, when it is determined that the predetermined condition is not satisfied and the temperature of the battery is not less than a threshold temperature higher than the predetermined temperature, the scavenging controlling portion is programmed not to perform the stop-time scavenging operation.

5. The fuel cell system according to claim 4, wherein:
   the scavenging controlling portion is programmed to perform scavenging on an anode side of the fuel cell and scavenging on a cathode side of the fuel cell individually in the parking scavenging operation; and
   the scavenging controlling portion is programmed to:
      i) when it is determined that the condition is not satisfied and it is determined that the temperature of the battery during the operation stop of the fuel cell is equal to or greater than the threshold temperature, perform the scavenging on the anode side of the fuel cell and the scavenging on the cathode side of the fuel cell in the parking scavenging operation; and
      ii) when the condition is satisfied or it is determined that the temperature of the battery during the operation stop of the fuel cell is less than the threshold temperature and not less than the predetermined value, perform the scavenging on the anode side in the parking scavenging operation.

6. The fuel cell system according to claim 1, wherein the scavenging controlling portion is programmed to:
   supply a larger amount of gas per unit time to the fuel cell when performing the stop-time scavenging operation with the second scavenging ability than when performing the stop-time scavenging operation with the first scavenging ability; and perform the stop-time scavenging operation with the second scavenging ability and the stop-time scavenging operation with the first scavenging ability for the same period of time.

7. The fuel cell system according to claim 1, wherein the scavenging controlling portion is programmed to:
supply a same amount of gas per unit time to the fuel cell when performing the stop-time scavenging operation with the second scavenging ability and when performing the stop-time scavenging operation with the first scavenging ability; and
perform the stop-time scavenging operation with the second scavenging ability for a longer time than the stop-time scavenging operation with the first scavenging ability.

8. A scavenging method for a fuel cell, the method being for scavenging the fuel cell at the time of an operation stop of the fuel cell by supplying gas to the fuel cell by use of electric power from a battery, the method comprising:
acquiring a presumed temperature that a temperature of the battery is presumed to reach during the operation stop of the fuel cell; and
determining whether or not the presumed temperature is a predetermined temperature or more, at the time of the operation stop of the fuel cell, wherein:
  i) when it is determined that the presumed temperature is the predetermined temperature or more at the time of the operation stop of the fuel cell, the scavenging of the fuel cell is performed with a first scavenging ability; and
  ii) when it is determined that the presumed temperature is less than the predetermined temperature, the scavenging of the fuel cell is performed with a second scavenging ability higher than the first scavenging ability.

9. The method according to claim 8, wherein:
when it is determined that the presumed temperature is the predetermined temperature or more, a parking scavenging operation is performed;
when it is determined that the presumed temperature is less than the predetermined temperature, the parking scavenging operation is not performed; and
the parking scavenging operation is performed such that, when the operation of the fuel cell is stopped, the supply of the gas to the fuel cell is controlled at a predetermined timing during the operation stop of the fuel cell, and perform the scavenging of the fuel cell.

10. The method according to claim 9, wherein:
at the time of the operation stop of the fuel cell, when it is determined that the presumed temperature is not less than a threshold temperature higher than the predetermined temperature, the scavenging of the fuel cell performed with the first scavenging ability is not performed.

11. The method according to claim 9, wherein:
it is determined whether or not a predetermined condition under which the fuel cell is frozen is satisfied; and
at the time of the operation stop of the fuel cell, when it is determined that the predetermined condition is not satisfied and the presumed temperature is not less than a threshold temperature higher than the predetermined temperature, the scavenging of the fuel cell performed with the first scavenging ability is not performed.

12. The method according to claim 11, wherein:
in the parking scavenging operation, scavenging on an anode side of the fuel cell and scavenging on a cathode side of the fuel cell are performable individually;
  i) when it is determined that the condition is not satisfied and it is determined that the presumed temperature is the threshold temperature or more, the scavenging on the anode side of the fuel cell and the scavenging on the cathode side of the fuel cell are performed in the parking scavenging operation; and
  ii) when the condition is satisfied or it is determined that the presumed temperature is less than the threshold temperature and not less than the predetermined value, the scavenging on the anode side is performed in the parking scavenging operation.

13. The method according to claim 8, wherein the temperature of the battery, detected at the time of the stop of the fuel cell, is acquired as the presumed temperature.

14. The fuel cell system according to claim 1, wherein the scavenging controlling portion is programmed to:
perform the stop-time scavenging operation with the first scavenging ability providing a first anode scavenging amount of gas supplied to an anode of the fuel cell and a first cathode scavenging amount of gas supplied to a cathode of the fuel cell; and
perform the stop-time scavenging operation with the second scavenging ability providing a second anode scavenging amount of gas supplied to the anode and a second cathode scavenging amount of gas supplied to the cathode of the fuel cell, wherein the second anode scavenging amount of gas is greater than the first anode scavenging amount of gas and wherein the second cathode scavenging amount of gas is greater than the first cathode scavenging amount of gas.

* * * * *